(12) United States Patent
Sarlashkar et al.

(10) Patent No.: US 7,236,876 B2
(45) Date of Patent: Jun. 26, 2007

(54) USE OF TRANSIENT DATA TO DERIVE STEADY STATE CALIBRATIONS FOR DYNAMIC SYSTEMS

(75) Inventors: Jayant V. Sarlashkar, San Antonio, TX (US); Charles E. Roberts, Jr., Helotes, TX (US); Scott J. Schneider, Dayton, OH (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/177,829

(22) Filed: Jul. 8, 2005

(65) Prior Publication Data

US 2006/0081608 A1    Apr. 20, 2006

Related U.S. Application Data

(60) Provisional application No. 60/586,637, filed on Jul. 9, 2004.

(51) Int. Cl.
*G01M 15/04*    (2006.01)
*F02D 45/00*    (2006.01)

(52) U.S. Cl. .................. 701/114; 701/102; 701/115; 60/285

(58) Field of Classification Search ............... 701/114, 701/115, 111, 108, 105, 104, 102; 700/29–32; 60/285, 605.2
See application file for complete search history.

(56) References Cited

U.S. PATENT DOCUMENTS

| | | | |
|---|---|---|---|
| 4,708,111 A * | 11/1987 | Shiozaki et al. | 123/357 |
| 5,072,700 A * | 12/1991 | Kawamura | 123/90.11 |
| 5,915,344 A * | 6/1999 | Suzuki et al. | 123/41.11 |
| 6,463,733 B1 | 10/2002 | Asik et al. | 60/276 |
| 6,539,705 B2 | 4/2003 | Beer et al. | 60/274 |
| 6,701,282 B2 | 3/2004 | Ting et al. | 702/185 |

FOREIGN PATENT DOCUMENTS

WO    WO 03/065135 A1 *    8/2003

OTHER PUBLICATIONS

PCT International Search Report, PCT/US05/24360, 6 pages, Sep. 1, 2006.

\* cited by examiner

*Primary Examiner*—Stephen K. Cronin
*Assistant Examiner*—Johnny H. Hoang
(74) *Attorney, Agent, or Firm*—Baker Botts, L.L.P.

(57) ABSTRACT

A method of identifying target outputs, such as emissions levels, for a dynamic system, such as an engine. The engine is run at numerous combinations of input parameters, such as actual settings. At each combination of input parameters, the system is driven to a "quasi-steady" state, rather than waiting for it to reach a steady state. Response data collected at this quasi-steady state is used as the basis for identifying the target outputs and the associated inputs.

11 Claims, 4 Drawing Sheets

USE OF TRANSIENT DATA TO DERIVE STEADY STATE CALIBRATIONS FOR DYNAMIC SYSTEMS

RELATED APPLICATION

This application claims priority to U.S. provisional patent application No. 60/586,637, entitled "Use of Transient Data to Derive Steady State Calibrations for Dynamic Systems" filed on Jul. 9, 2004.

TECHNICAL FIELD OF THE INVENTION

This invention relates to calibration techniques for dynamic systems having one or more actuators, such as engine systems.

BACKGROUND OF THE INVENTION

Traditional calibration techniques for engines are based upon steady-state data collection on an operating engine, over a range of actuator settings and operating conditions. The steady state data is used with an optimization methodology to arrive at optimal or near optimal actuator settings to achieve goals for engine emissions, performance, and fuel economy.

The effectiveness of the traditional technique is high, in that optimal actuator settings can be found. However, the time required for the data collection and optimization process is too long. Considerable time is consumed by the data collection process because the engine must stabilize at each test point until steady state operation is achieved.

For situations in which true steady state is unachievable or requires too much time, transient data may be acquired, with the assumption that the persistent transient behavior of the engine will not appreciably affect the final steady state calibration. Of course, for highly transient engine operation, this assumption leads to poor calibration results.

Advanced methods for selection and use of "fractional" experimental data sets for use in the optimization process generally fall into the category of statistical design of experiments. The key to the method is in selection of experimental data points that will be most useful, while elimination of less useful data points, during acquisition, is made. Hence, the eliminated data is not available for later use. The time savings accomplished with these methods is a strong function of the numbers of experimental points not tested. A tradeoff exists in time-savings versus the ability to arrive at optimal actuator settings with a fractionated experimental data set.

DETAILED DESCRIPTION OF THE INVENTION

The basis of the invention is a transient method for deriving steady state engine calibrations. The method is based upon non-steady state experimentally derived data, which is manipulated to arrive at steady-state optimal actuator settings.

More specifically, unlike conventional calibration methods, data acquisition is not delayed until the engine fully settles at each test point. Instead, as explained below, slow response variables are distinguished from fast ones. The engine is calibrated for the fast settling variables, and correction terms are added for slow variables.

The use of transient experimental data to derive steady state optimal actuator settings provides dramatic time-savings for engine calibration. This technique offers high value to the engine and engine-related industry by reducing the time and cost of calibrating engines.

Although the proposed calibration method does not rely on steady state data, it accounts for the transient nature of the test when optimizing the engine calibration. A key to the proposed invention is the recognition that a description of optimized actuator settings for the transient engine system will naturally include optimal calibration for the steady state system.

It is recognized that all steady state systems are a subset of a more mathematically complex transient system. In other words, a mathematical description of the dynamic system will contain a full description of steady state behavior. This is seen in mathematical descriptions of physical processes, where the solution for the current state of the system is a combination of time dependent and non-time-dependent terms.

For purposes of example, this description is in terms of a heavy duty diesel engine and typical actuators used on such an engine. However, the same concepts are applicable to other engines and their actuators, and the engines may be internal and external combustion engines. In fact, the concepts described herein could be applied to any dynamic system having actuators that are calibrated in response to system operating conditions.

Figure 1:
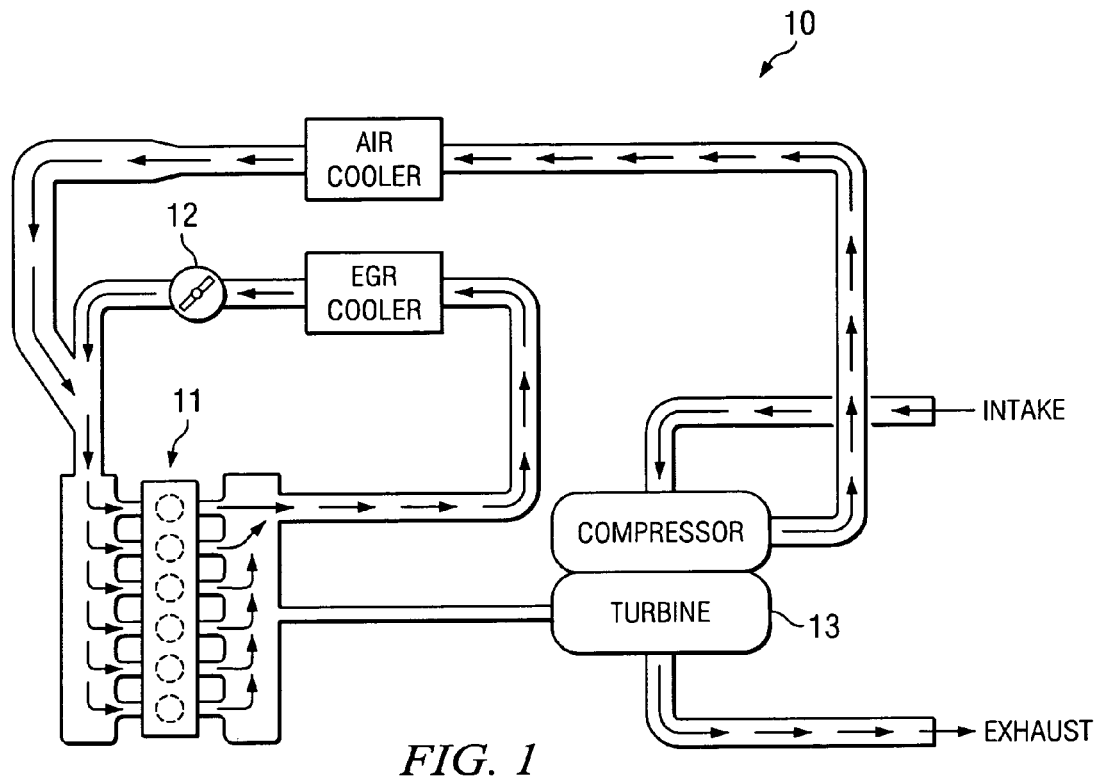
FIG. 1 illustrates a diesel engine having actuators to be calibrated in accordance with the invention.

FIG. 1 illustrates an example of a modern heavy-duty diesel engine 100. For purposes of example, actuators for controlling the following parameters are assumed to be available on this engine:

1. fuel mass (quantity of fuel injected, fuel can be split across multiple injections)
2. fuel timing (timing of fuel injection in terms of crank position, for multiple injections timing of each is separately controlled)
3. Fuel rail pressure (FRP)
4. Position of the exhaust gas recirculation (EGR) valve
5. Position of the variable geometry turbocharger (VGT) vane or other turbocharger output means Actuators associated with these parameters include fuel injectors 11, EGR valve 12, and turbocharger vane 13.

The following is a subset of the optimization variables of interest, available directly from, or derived from, measurements taken by various engine sensors:

1. Brake specific fuel consumption (BSFC)
2. Engine torque
3. Engine out NOx emission
4. Engine out particulate emission
5. Peak cylinder pressure
6. VGT speed With more than six degrees-of-freedom, one can obtain desired torque (or any other output) from the engine with many different combinations of actuator setpoints. Some of these combinations are more desirable than the others, and it is in this sense that a combination of settings is viewed as "optimal".

Example Optimization Problem

An example of an optimization problem may be stated as follows: Given an engine, find, for a specified engine speed, actuator settings to produce specified torque so as to minimize the BSFC while not exceeding specified thresholds of engine out NOx and particulate emissions, peak cylinder pressure, and VGT speed.

This is a classic constrained optimization problem, except that there are no expressions/formulae for the engine outputs as functions of the actuator settings. Such relations, however, can be "constructed" from measurements performed on the actual system.

Lumped Parameter Description of Dynamical Systems

Before proceeding, we define the "state" of the engine system. If the states are known, the system is fully defined.

More specifically, we consider a lumped parameter, state-space model of a dynamic system and how it relates to the optimization problem above. Thus, $$\dot{x}=f(x,u), y=g(x,u),$$

where $x \subset X \in \Re^n$ is the state vector and $u \subset \in \Re^m$ is the input vector.

Let $x^*$ denote an equilibrium point (steady state) of interest for a given input vector u. One can appeal to an implicit function theorem, and solve $0=f(x, u)$ for $x^*$ in terms of u at least locally around $x^*$, say, $$x^*=h(u)$$

This solution provides a steady state value of x in terms of input u. Substituting for x in the output equation:

$$y^*=g(x^*, u)=g(h(u),u)=\hat{g}(u).$$

The above equation forms the basis of "input-output" mapping for a dynamical system in steady state. It simply states that the outputs of a system in steady state depend solely upon its inputs. However, this expression gives no indication as to how long may one have to wait before a steady state is reached.

One way to address the question of how long to wait is to consider the eigensystem (eigenvalues, eigenvectors) associated with the linearized system matrix $D_1 f|x^*$. This provides an insight into local behavior of the system around $x^*$. Assume that the eigenvalues can be grouped as relatively "slow" and fast" depending on their real part.

Based on the eigenvectors, one can in turn label some states, $x_s$, as relatively "slow" and other states, $x_f$, as "fast". Given this partitioning of states, one can rewrite the above as:

$$\dot{x} = \begin{pmatrix} \dot{x}_s \\ \dot{x}_f \end{pmatrix} = \begin{pmatrix} f_s(x, u) \\ f_f(x, u) \end{pmatrix}$$

One way to obtain a reduced order system description is to assume that the fast states $x_f$ have settled. In that case, $0=\dot{x}_f=f_f(x,u)$. Assume that one could solve this implicit equation for $x_f$: $x_f=\varphi(x_s, u)$ to obtain:

$$\dot{x}_s=\hat{f}(x_s,u), y=\hat{g}(x_s,u),$$

where $$\hat{f}(x_s, u) = f\left(\begin{pmatrix} x_s \\ \varphi(x_s, u) \end{pmatrix}, u\right)$$

and $\hat{g}$ is similarly defined.

An important conclusion then is that in quasi-steady state where one waits just long enough for the "fast" states to settle, the system outputs can be viewed to depend solely on the slow states and the inputs. Notice that this is different from the earlier conclusion that in steady state, the outputs depend solely on the inputs.

Approximate Output Functions

We now seek to express the outputs in terms of inputs and slow states. Look-up tables are a common way to express functional relationships. A function is locally (interior to a grid box) approximated by a linear combination of its values at the corners of the box. For such a representation, the product space $U \times X_s$ must first be gridded. The system is driven to each of the gridpoints in the product space. Implicit in this step is settling of fast dynamics. Then, system outputs of interest are measured.

It must be noted that one can apply arbitrary settings (within permissible range) to actuators; however, no such direct control is necessarily possible over system states. One can manipulate a sequence of system inputs to drive the system to a certain state; such possibility depends on the controllability of the system.

Quasi-Steady State Measurements

The method proposed here employs a-priori gridding of the input space U alone, not $U \times X_s$.

In Step 1, about each such gridpoint, the actuators are subjected to rate-limited simultaneous excursions up to the neighboring gridpoints.

In Step 2, the rates are chosen to be slower than the fast system states. Fast states are usually known to experienced test engineers and seldom need to be identified via the eigensystem analysis mentioned earlier. Note that the rates must as well be slower than the slowest sensor used.

In Step 3, a linear mathematical model of the output quantities is then derived. Note that this method does not guarantee complete coverage of the entire product space $U \times X_s$, because we actively operate only in the product space of U. In such cases, we use the "nearest neighbor extrapolation" to fill the table.

Optimization

The optimization method proposed here is named "Sequential Linear (or Quadratic) Program with Sequential Relaxation," and is described below:

In Step 1, for each of the hyperboxes defined by the gridding of $U \times X_s$ a linear programming (LP) problem is constructed and solved. The objective function, equality, and inequality constraints are all approximated by their respective linear representation constructed above. Note that the variables of the LP are subjected to the natural box constraint defined by the grid.

In Step 2, we begin with tightest inequality constraints (say, NOx emission less than some small number).

In Step 3, the solutions to this sequence of LP (one per hyperbox) are enumerated and the best solution is selected In Step 4, if no solutions are found, the inequality constraints are sequentially relaxed (say, little more $NO_x$ emission allowed) and the process repeated In Step 5, the resulting solution is then verified on the actual engine. Should this verification fail, the input space U is either refined (finer gridding) or enlarged (larger operating range during data collection) and the process repeated.

Optimization of Automated Engine Test Cell

Figure 2:
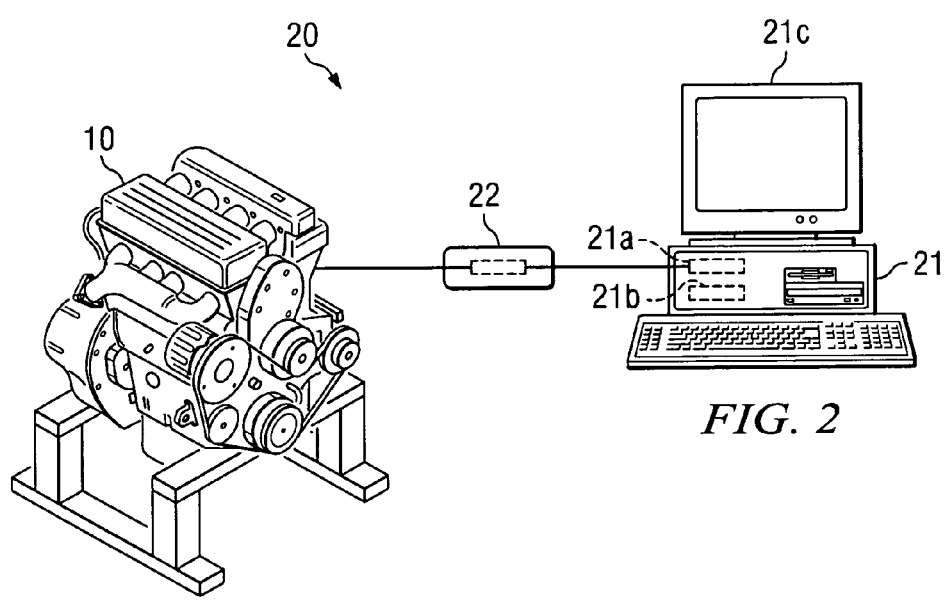
FIG. 2 illustrates an engine control system for implementing actuator calibration in accordance with the invention.

FIG. 2 illustrates an engine test system 20 for "driving" a test engine 10. A feature of engine test system 20 is that it is capable of running engine 10 at any desired speed/load point and at selected settings of its actuators. System 20 may be implemented with conventional computer hardware 21, such as a workstation or desktop computer, and is programmed to implement control algorithms. The software permits control over various engine parameters, including fueling, ignition, exhaust gas recirculation, and idle air.

Other hardware associated with system 20 are an analog to digital (A/D) converter 21b, an engine controller 21a, and external driver unit 22. The engine controller 21a is a card (or multiple cards, depending on the number of cylinders) is inserted into the computer 21. It contains an integrated circuitry that acts as an engine control chip and a specialized timer. The injector/spark/pulse width modulator (PWM) driver 22, controls various actuators of engine 21.

An engineer programs the computer 21 using a standard programming language, such as C, and the controller 21a transfers the instructions to the engine 10. Users of system 20 can change basic control configurations, such as number of cylinders, firing order, and other parameters, simply by entering numbers on an interface screen of computer 21.

The engine control capability of system 20 gives rise to the issue of what actuator settings are optimal for a desired operational feature of the engine. For purposes of this description, the desired operational feature is referred to as an "optimization variable". Examples of optimization variables are the level of NOx emissions, the level of unburned hydrocarbon particles in the emissions, the brake specific fuel consumption (BSFC), the coefficient of variation for indicated mean effective pressure (COV-IMEP), and peak cylinder pressure. It should be understood that these are but a few of the many possible optimization variables that may be associated with an engine.

In accordance with the methods described above, the engine control algorithms compute optimum values for fueling, ignition, idle air, and exhaust gas recirculation from input received from the A/D converter 21b and engine controller 21a. The computed values are sent back to the engine controller 21a, which activates the driver 22, which controls various actuators of engine 10. In this manner, the above described method may be implemented with software as part of an engine control system. Once optimum values have been derived and tested, they may also be used as calibration values to calibrate the associated actuators of production engines.

Figure 3:
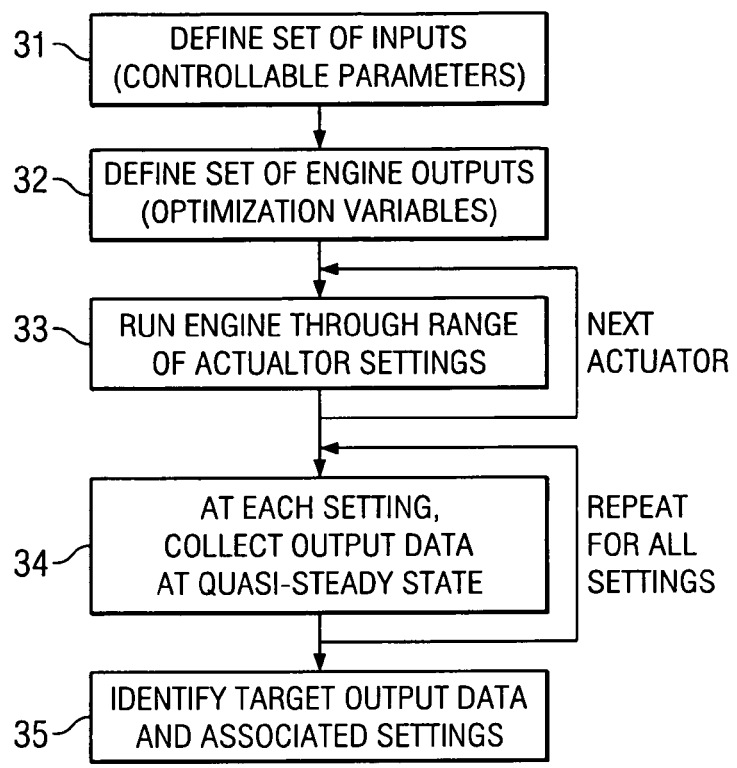
FIG. 3 illustrates the optimization method implemented with the system of FIG. 2.

FIG. 3 illustrates how the above-described optimization method is implemented with programming of system 20. In Step 31, a set of input parameters is defined. These include controllable parameters, such as those listed above. Typically, each input is associated with an actuator, which has settings that may be adjusted through a range of test settings. Step 32 is defining a set of engine outputs, such as the optimization variables listed above. In Step 33, system 20 is used to drive engine 10 through ranges of settings for selected inputs.

Step 34 involves collection of response data. As described above, at each combination of settings, the engine is allowed to reach a "quasi-steady" state. Various combinations of settings are made and the engine is run to the quasi-steady state. In Step 35, from the response data, target values can be identified as well as the engine inputs associated with the optimal values. The target values may also be "optimal" in the sense that they are absolute optimal values for a particular response, or in the sense, that in view of all desired engine conditions, they are the "best" values.

Figure 4:
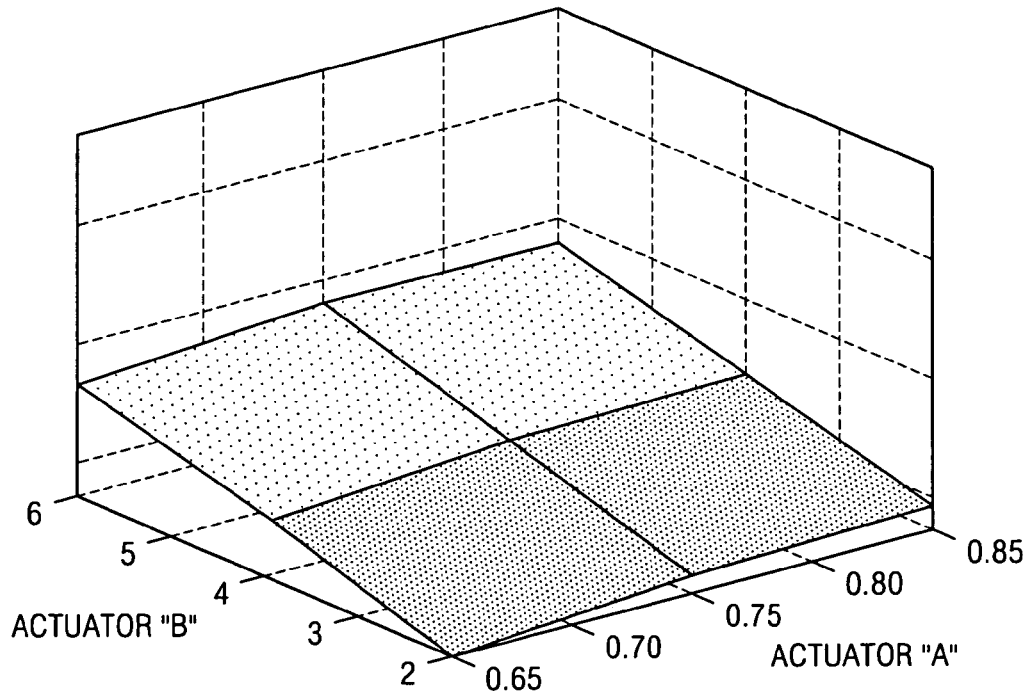
FIGS. 4–6 illustrate response surfaces for a single speed range, with the calibration variables shown as a function of two different actuators.
Figure 5:
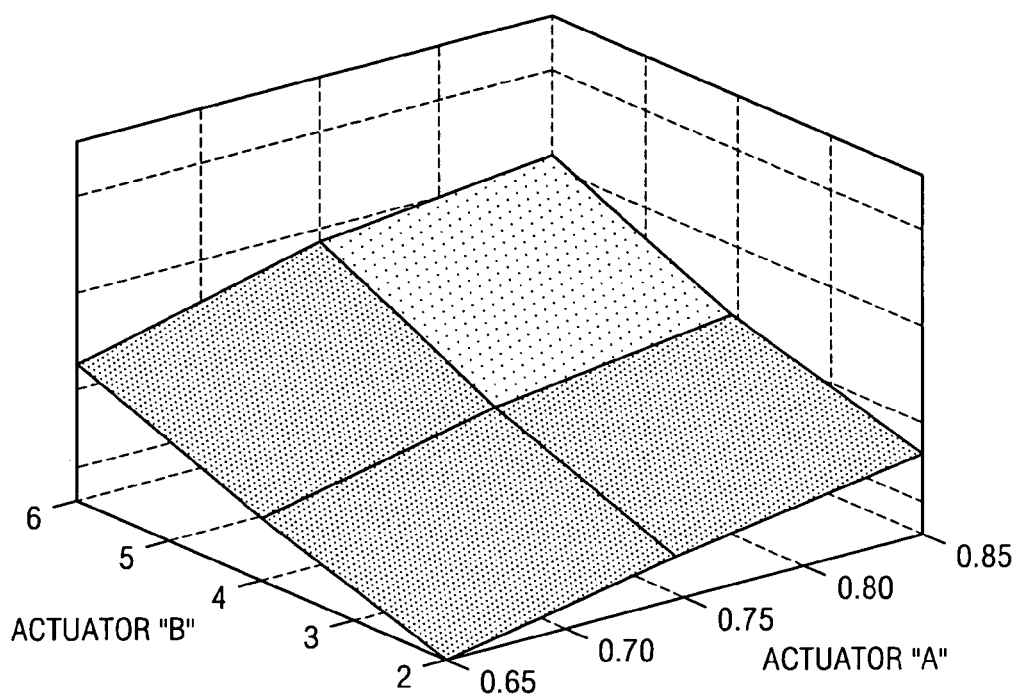
Figure 6:
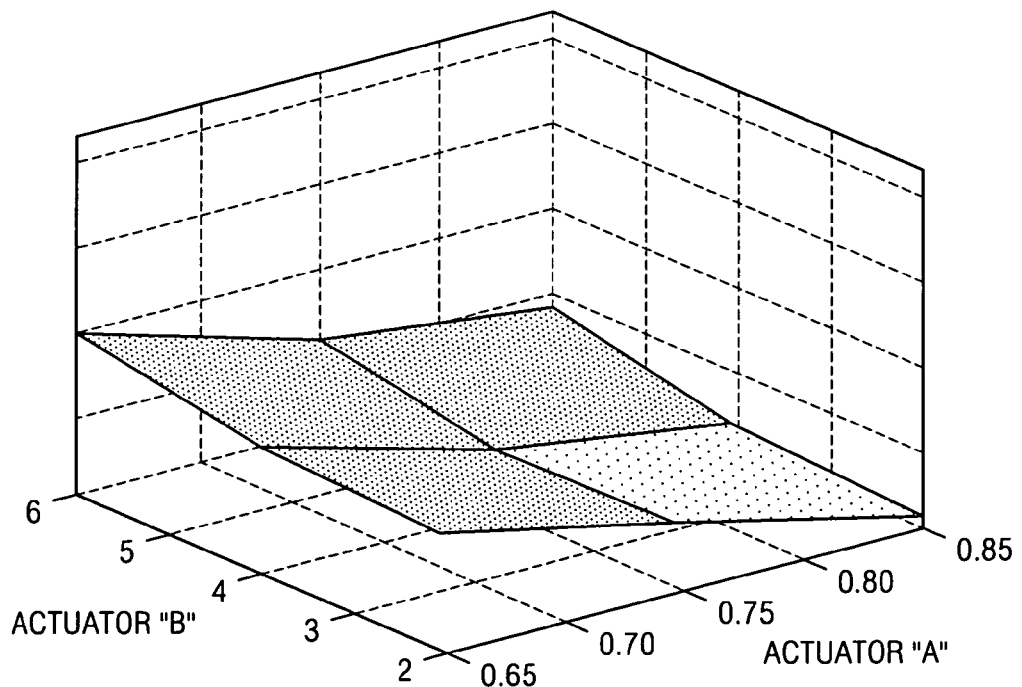

FIG. 4–6 illustrate data acquisition for a range of data acquired for a single speed range. Calibration variables are shown as a function of injection timing and VGT position (Actuator A and Actuator B). Each figure illustrates a different response surface, specifically, torque output, NOx production, and peak cylinder pressure, respectively.

Figure 7:
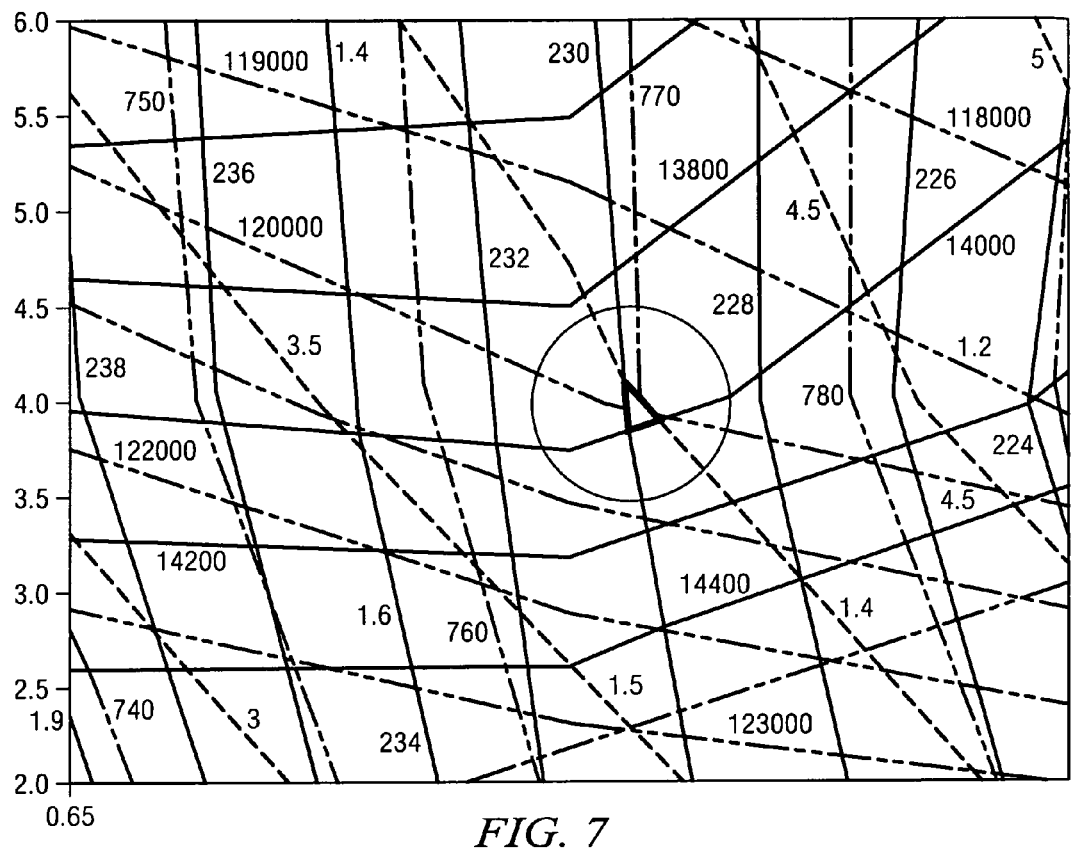
FIG. 7 illustrates how optimum calibration point is found by plotting each response.

FIG. 7 illustrates how an optimum calibration point is found by plotting each response.

Figure 8:
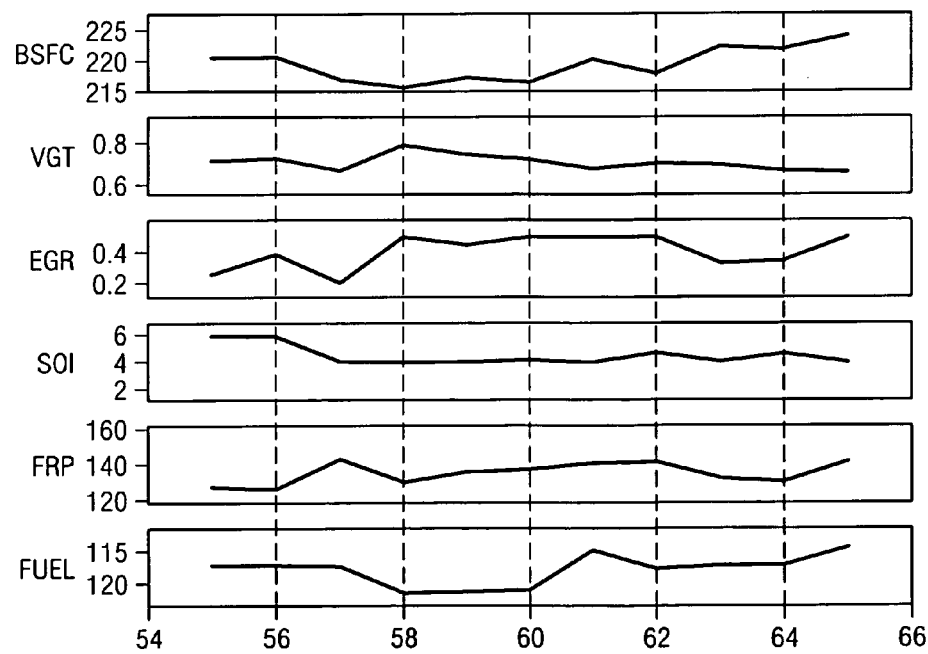
FIG. 8 illustrates, for various responses, calculated optimal setpoints.

FIG. 8 illustrates, for various responses, calculated optimal setpoints. In the example of FIG. 7, the x axis represents an uncontrolled variable such as intake charge temperature. The actuator charts indicate the actuator positions for absolute optimums for minimizing fuel consumption at various intake charge temperatures.

It should be noted that the method can be used to identify inputs for steady state as well as transient engine output responses.

What is claimed is:

1. A method of collecting engine response data from an internal combustion engine, the engine having a number of actuators, comprising:

defining a set of input parameters to the engine;

wherein the input parameters represent settings of one or more engine actuators;

defining a set of engine response variables;

defining one or more of the engine response variables as slow response variables, which are slow to reach steady state after a change in one or more of the input parameters;

defining one or more of the engine response variables as fast response variables, which are fast to reach steady state after a change in one or more of the input parameters;

operating the system for a succession of settings for at least one actuator;

acquiring response data at a time before the one or more slow response variables have reached steady state and after the one or more fast response variables have reached steady state; and correcting the response data with data representing the effect of the one or more slow response variables.

2. The method of claim 1, wherein the actuators control one or more of the following inputs: fuel mass, fuel timing, fuel rail pressure, EGR amount; turbocharger output.

3. The method of claim 1, wherein the engine outputs are one or more of the following variables: fuel consumption, engine torque, emissions, cylinder pressure, or turbocharger speed.

4. A method of collecting and optimizing engine response data from an internal combustion engine, the engine having a number of actuators, comprising:

defining a set of input parameters to the engine;

wherein the input parameters represent settings of one or more of the actuators;

defining a set of engine response variables;

defining one or more of the engine response variables as slow response variables, which are slow to reach steady state after a change in one or more of the system input parameters;

defining one or more of the engine response variables as fast response variables, which are fast to reach steady state after a change in one or more of the input parameters;

operating the engine for a succession of settings for at least one actuator;

acquiring response data at a time before the one or more slow response variables have reached steady state and after the one or more fast response variables have reached steady state;

correcting the response data with data representing the effect of the one or more slow response variables; and identifying optimum actuator setting values, which represent values for input parameters that result in desired values for one or more response variables.

5. The method of claim 4, wherein the actuators control one or more of the following input parameters: fuel mass, fuel timing, fuel rail pressure, EGR amount; turbocharger output.

6. The method of claim 4, wherein the response variables are one or more of the following: fuel consumption, engine torque, emissions, cylinder pressure, or turbocharger speed.

7. The method of claim 5, wherein the correcting step is performed by interpolating to a next steady state value.

8. The method of claim 5, wherein the identifying step is performed with an optimization algorithm.

9. A method of controlling an internal combustion engine, the engine having a number of actuators, comprising:

defining a set of input parameters to the engine;

wherein the input parameters represent settings of one or more of the actuators;

defining a set of engine response variables;

defining one or more of the engine response variables as slow response variables, which are slow to reach steady state after a change in one or more of the input parameters;

defining one or more of the engine response variables as fast response variables, which are fast to reach steady state after a change in one or more of the system input parameters;

operating the engine for a succession of settings for at least one actuator;

acquiring response data at a time before the one or more slow response variables have reached steady state and after the one or more fast response variables have reached steady state;

correcting the response data with data representing the effect of the one or more slow response variables;

identifying optimum actuator setting values, which represent values for input parameters that result in desired values for one or more response variables; and using the optimum actuator setting values to provide control signals to the actuators.

10. An improved engine control system, programmed with engine control algorithms, the engine having a number of actuators, and the improvement being:

an engine control memory having stored actuator settings at a range of engine speeds;

wherein the actuator settings are based on optimization data, acquired by the following steps: operating each actuator through a range of settings; acquiring engine response data by simulating operation of the engine to a quasi-transient state where responses from changes in some of the actuators settings have settled and responses from changes in other of the actuator settings have not settled; correcting the engine response data for slower settling actuators; and selecting actuator settings that correspond to optimal corrected engine response data.

11. A computer readable medium encoded with a computer program for controlling actuator settings of an internal combustion engine, comprising:

stored actuator setting values obtained by the following process: operating each actuator through a range of settings; acquiring engine response data by simulating operation of the engine to a quasi-transient state where responses from changes in some of the actuators settings have settled and responses from changes in other of the actuator settings have not settled; correcting the engine response data for slower settling actuators; selecting actuator settings that correspond to optimal corrected engine response data; and storing the actuator settings in the computer readable medium.

* * * * *